United States Patent [19]

Lough et al.

[11] 3,986,301

[45] Oct. 19, 1976

[54] APPARATUS FOR LAPPING THE EDGES OF A METAL FOIL TAPE

[75] Inventors: Merlin E. Lough, Fox Island; Gene E. Mertz, Woodinville; Harold L. Springer, Kirkland; Lawrence H. White, Edmonds, all of Wash.

[73] Assignee: Sundstrand Data Control, Inc., Redmond, Wash.

[22] Filed: Jan. 27, 1975

[21] Appl. No.: 544,486

[52] U.S. Cl. .................................. 51/112; 51/5 R
[51] Int. Cl.² ........................................ B24B 9/00
[58] Field of Search ............... 51/3, 5 R, 80 R, 80 A, 51/112, 140, 138, 75, 80 B

[56] References Cited
UNITED STATES PATENTS

| | | | |
|---|---|---|---|
| 1,784,231 | 12/1930 | Gardner | 51/112 |
| 2,061,918 | 11/1936 | Nanfeldt | 51/112 |
| 2,958,163 | 11/1960 | Cammerzell | 51/5 R |
| 3,906,676 | 9/1975 | Orlando | 51/112 |

FOREIGN PATENTS OR APPLICATIONS

| | | | |
|---|---|---|---|
| 1,023,488 | 12/1952 | France | 51/112 |
| 759,975 | 10/1956 | United Kingdom | 51/112 |

*Primary Examiner*—Al Lawrence Smith
*Assistant Examiner*—Nicholas P. Godici
*Attorney, Agent, or Firm*—Wegner, Stellman, McCord, Wiles & Wood

[57] ABSTRACT

An apparatus for lapping the edges of a metal foil tape to remove burrs. A pair of coaxial counter-rotating wheels have facing annular abrasive surfaces which are spaced apart a distance less than the width of the tape. The tape is drawn between the wheels, generally along the wheel diameters, with the tape edges in engagement with the abrasive surfaces. The peripheral velocity of the wheels is substantially greater than the lineal speed of the tape so that the tape edges are polished substantially at right angles to the plane of the tape.

21 Claims, 10 Drawing Figures

APPARATUS FOR LAPPING THE EDGES OF A METAL FOIL TAPE

This invention is concerned with an apparatus for lapping the edges of a metal foil tape.

Metal foil tapes are commonly manufactured by slitting a foil web of substantial width to the tape width desired. The slitting operation leaves a burr on the tape edges. For some uses of metal foil tape, burrs are undesirable. The apparatus and method disclosed herein remove such burrs.

One feature of the invention is the provision of an apparatus for lapping metal foil tape edges including a pair of axially aligned counter-rotating wheels having facing abrasive surfaces, together with means for directing the tape between the abrasive surfaces with the plane of the tape generally at right angles to the planes of the abrasive surfaces. The spacing between the abrasive surfaces is less than the width of the tape so that both tape edges are held in contact with the abrasive surfaces. More specifically the abrasive surfaces are annular and the tape is directed generally along diameters of the wheels.

Another feature is that the apparatus includes two pairs of counter-rotating abrasive wheels and the tape is directed serially between the first and then the second pair of wheels. The spacing between the second set of wheels is less than that between the first.

A further feature is the provision of an adjustable mounting for each of the wheels to vary the spacing between the abrasive surfaces.

And another feature of the invention is the method of lapping the edges of the metal tape which comprises drawing the tape between counter-rotating annular abrasive surfaces spaced apart a distance less than the width of the tape, in which the linear tape speed is less than the peripheral velocity of the abrasive surfaces.

Further features of the invention will readily be apparent from the following specification and from the drawings, in which.

The apparatus illustrated and described herein is particularly suited for lapping the edges of a magnetic tape used in aircraft cockpit recorders. Federal regulations require many aircraft to have a multitrack recorder for various aircraft parameters, and further require that the recording medium withstand severe conditions such as the high temperature of a fire, in the event of a crash. A vanadium-cobalt iron alloy sold under the trademark VICALLOY by Arnold Engineering, has been found suitable. A typical foil tape has the width of 0.250 inch and a thickness of 0.0005 inch. The foil is commonly rolled in a web several inches wide and several hundred feet in length. The web is then slit into quarter inch tapes. The slitting operation leaves burrs along the edge of the tape which, although generally microscopic in size, are sufficiently large to lift the tape away from the surface of the magnetic head and often break off, contaminating the recording head and the tape to head interface. The quality of the recording is impaired resulting in an inaccurate data record.

Figure 1:
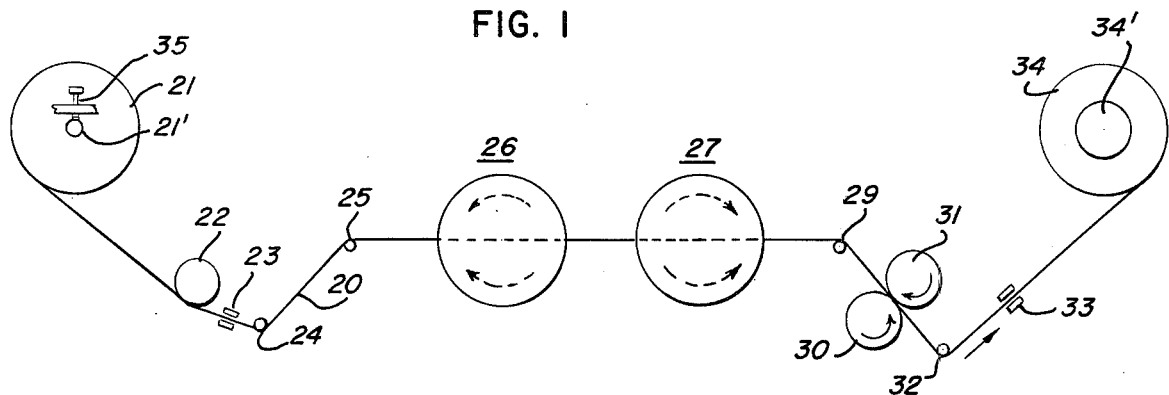
FIG. 1 is a diagrammatic elevation of an apparatus illustrating the invention.
Figure 2:
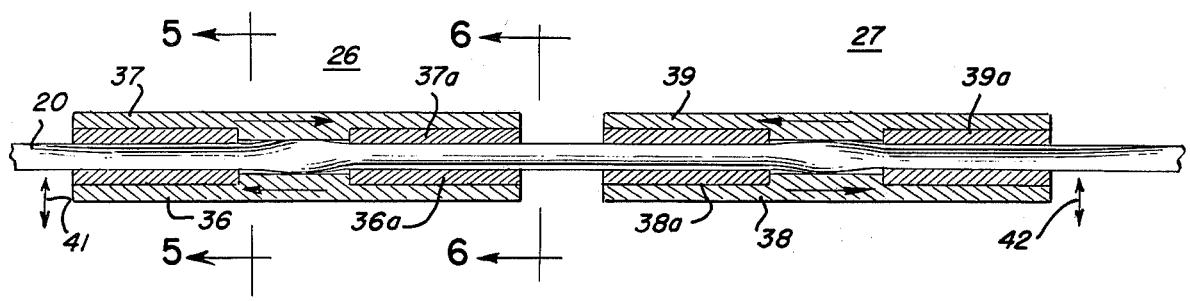
FIG. 2 is a fragmentary plan view of the apparatus of FIG. 1.

The apparatus for lapping the edges of the tape foil is illustrated diagrammatically in FIGS. 1 and 2. Tape 20 from supply reel 21 is directed over a tape guide 22 through a tape sensor 23 and around rollers 24, 25 to first and second pairs of lapping wheels 26 and 27. Following lapping the tape is trained over roller 29, between brushes 30, 31, over roller 32, through a tape sensor 33 and to a driven take-up reel 34. Between the brushes 30, 31 and take-up reel 34, the tape may be subjected to further treatment, as for removing surface scale and for applying a lubricating coating.

The first pair of wheels 26 has a wheel 36 which rotates counterclockwise and a wheel 37 which rotates clockwise. Both wheels have annular abrasive surfaces 36a, 37a with open recessed center sections and the wheels are coaxial and parallel. Similarly, the second pair of wheels 27 has coaxially arranged wheels 38 and 39 with annular abrasive surfaces 38a, 39a. Wheel 38, which is generally coplanar with wheel 36 turns clockwise while wheel 39 is generally coplanar with wheel 37 and rotates in a counterclockwise direction. Tape 20 is directed serially between each pair of wheels, generally along diametric lines. The plane of the tape is oriented generally at right angles to the parallel planes of the abrasive surfaces of the wheels.

The axial position of the wheels of each pair is adjustable as indicated by arrows 41, 42, and the spacing is selected to be slightly less than the width of the tape 20.

Figure 3:
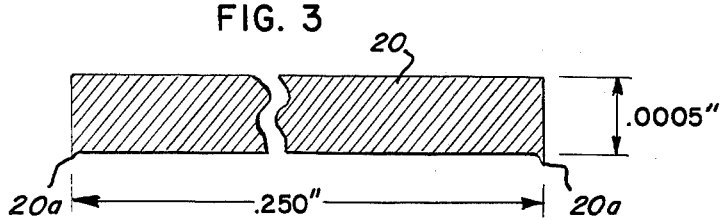
FIG. 3 is a section through a typical metal foil tape (not to scale) prior to lapping.
Figure 5:
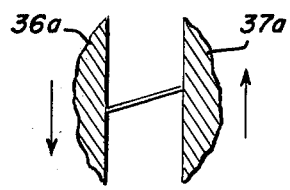
FIG. 5 is a fragmentary section taken along line 5—5 of FIG. 2.
Figure 4:
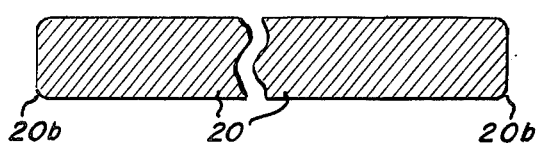
FIG. 4 is a view similar to FIG. 3 of the metal foil tape following lapping.
Figure 6:
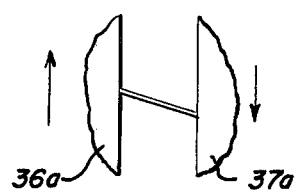
FIG. 6 is a fragmentary section taken along line 6—6 of FIG. 2.
Figure 7:
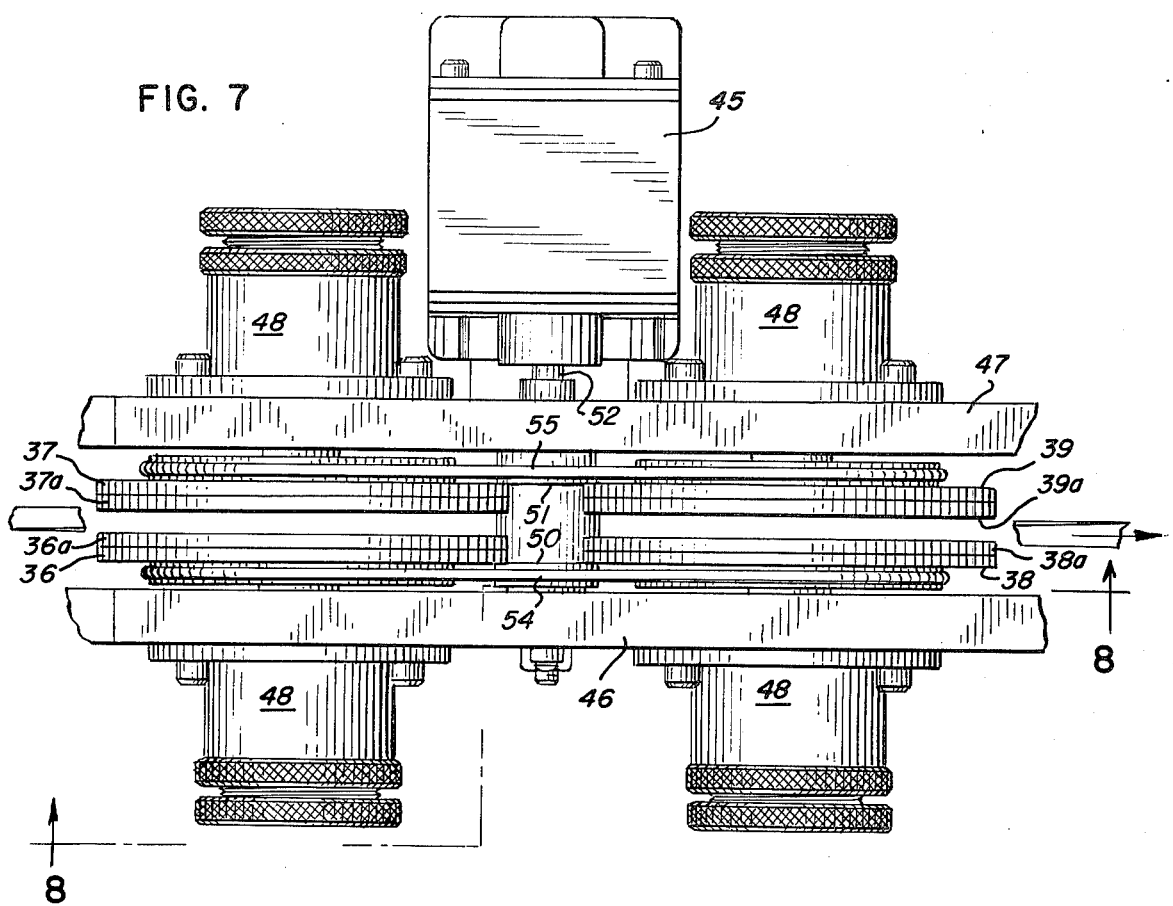
FIG. 7 is a plan view of the lapping wheels and their mountings.
Figure 8:
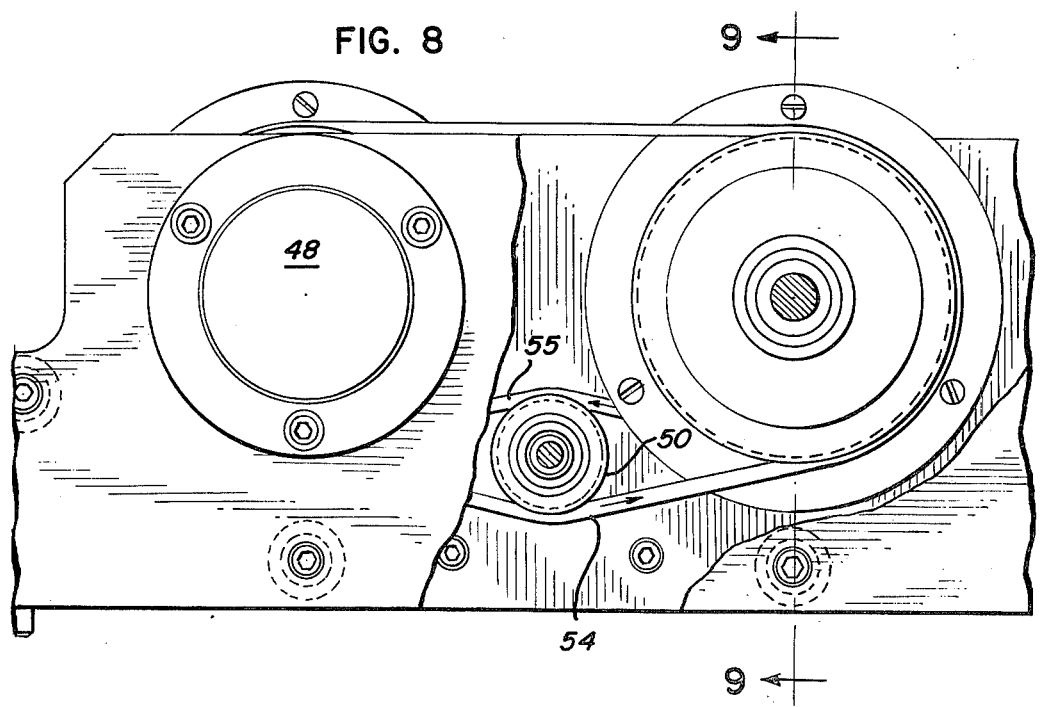
FIG. 8 is a fragmentary elevation with a portion broken away, looking upwardly from the bottom of FIG. 7.

The tape is drawn between the wheels under tension as will be explained below, and with the tape edges in contact with the abrasive surfaces of the wheels. Friction of the wheels on the edges of the tape causes the tape to twist, with the twist reversing as the tape passes from side to side through the recessed center section of the wheels, as seen by comparing FIGS. 5 and 6. The lapping action of the abrasive surfaces on the tape edges removes the burrs 20a, FIG. 3, leaving the edges rounded as illustrated at 20b, FIG. 4.

Counter-rotating brushes 30, 31 remove any of the loose metal particles which are left on the tape following the lapping treatment.

The following discussion of specific operating conditions is concerned with an embodiment of the invention found suitable for lapping the alloy tape described above with a width of 0.250 inch and a thickness of 0.0005 inch. The tape is drawn from supply reel 21 through the lapping apparatus to the take-up reel 34 at a speed of 20 feet per minute (4 inches per second) and a tension of the order of 10 to 15 ounces. The facing abrasive surfaces of the first pair of wheels 26 are spaced apart 0.230 inches while the facing abrasive surfaces of the second pair of wheels 27 are spaced apart a distance of 0.215 inch.

Take-up reel 34 is driven by motor 34' to draw tape 20 from supply reel 21 and through the treatment apparatus. An adjustable brake 35 bears on shaft 21' for supply reel 21 and enables an operator to select the tension in the tape. Sensors 23 and 33 detect the presence or absence of tape 20 and may be utilized to control actuation of the reel and other drive motors.

The wheels 36, 37, 38 and 39 have a diameter of 4 inches and the annular abrasive surfaces 36a, 37a, 38a, 39a have an inner diameter of 1 inch. The speed of rotation of the wheels is limited by the temperature which the abrasive material can withstand. Diamond dust embedded in a soft metal carrier as a copper or bronze ring, has been found satisfactory, but the speed of rotation is limited to the order of 1200 rpm as the diamond dust should not exceed an operating temperature of the order of 1500° F. A boron nitride abrasive material sold by General Electric under the trademark BORAZON has been found to be stable to operating temperatures of 2400° F., and a speed of the order of 3600 rpm may be used. The quality of the edge finish is directly related to the speed of the lapping surfaces. It is important that the abrasive particles intersect the edge of the tape substantially at right angles to the plane of the tape. This relationship is achieved even at the speed of 1200 rpm where the peripheral velocity of the outer periphery of the abrasive surface is 250 inches per second and at the inner periphery of the abrasive surface is 63 inches per second. Both speeds are much greater than the lineal tape speed of 4 inches per second.

The adjustable mountings for the wheels which enable variation of axial spacing and precise adjustment of the planes of the abrasive surfaces, and the drive for effecting counter-rotation of the wheels are illustrated in FIGS. 7–10. The four wheels 36, 37, 38 and 39 and drive motor 45 are carried on spaced apart front and rear support plates 46, 47. Each of the wheels is carried by an adjustable mounting means 48, one of which will be described in detail below. A pair of spur gears 50, 51 are driven directly from the shaft 52 of motor 45. Non-slip drive belts 54, 55 are driven from spur gears 50, 51, respectively, and belt 54 drives wheels 36, 38 while belt 55 drives wheels 37, 39. The belts are trained on opposite sides of the spur gears 50, 51 so that belt 54 is driven in counterclockwise direction while belt 55 is driven in a clockwise direction. Thus, coplanar wheels 36, 38 turn in opposite directions as do coplanar wheels 37, 39.

Figure 9:
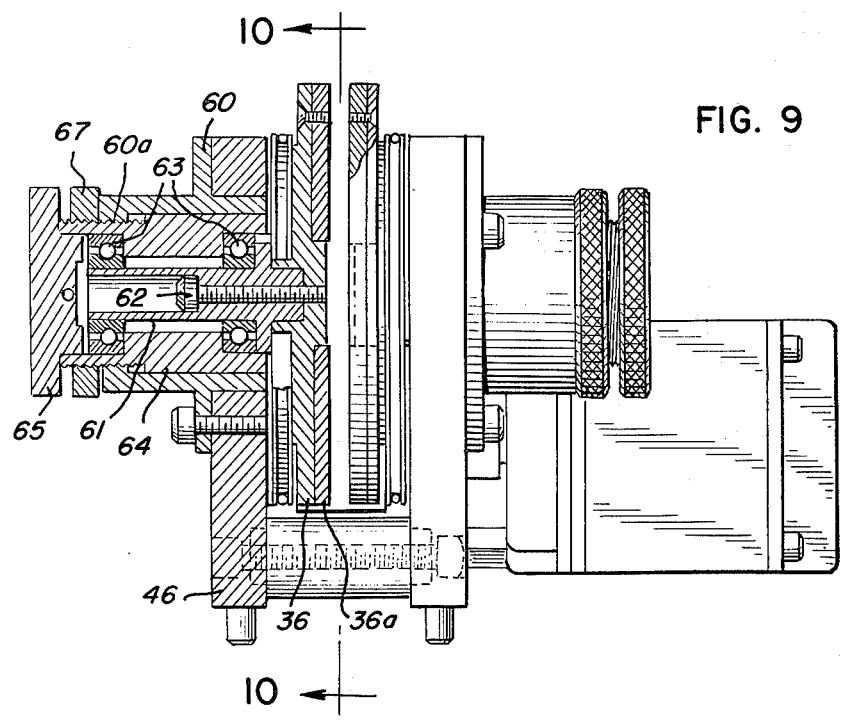
FIG. 9 is a section through a mounting of a lapping wheel.
Figure 10:
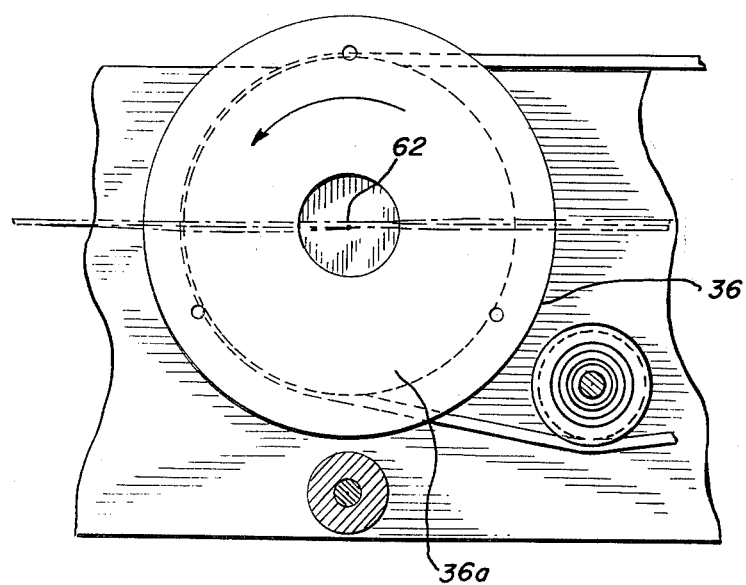
FIG. 10 is an elevation of a lapping wheel taken along line 10—10 of FIG. 9.

The adjustable wheel mounting shown in detail in FIG. 9. A bearing housing 60 is secured to support plate 46 and has an outer end portion 60a which is threaded. Wheel 36 is mounted on a shaft 61 by a cap screw 62. The shaft is rotatably supported in bearings 63 the outer races of which are press fit in a bearing carrier 64 which is threaded to the threaded portion 60a of housing 60. A manual adjustment knob 65 is secured to the outer end of bearing carrier 64. Movement of bearing carrier back and forth adjusts the axial position of wheel 36. A lock nut 67 retains the adjusted position of the wheel. All four wheels are similarly mounted and the planes of the wheels and spacings between the abrasive surfaces may readily be established.

We claim:

1. Apparatus for deburring the edges of a flexible metal tape, comprising:
    means providing a supply of flexible metal tape;
    a pair of axially aligned wheels having facing abrasive surfaces spaced apart a distance less than the width of the tape;
    means for rotating the wheels in opposite directions;
    means for drawing tape from the supply under tension in a path between said abrasive surfaces with the edges of the tape engaging the abrasive surfaces in a manner to twist the tape.

2. The lapping apparatus of claim 1 in which each abrasive surface is annular.

3. The lapping apparatus of claim 2 in which there is a central recess inside said annular abrasive surface and said tape is directed across two portions of the annular surface and the intermediate recess, and the twist in the tape is reversed in crossing the intermediate recess.

4. The lapping apparatus of claim 3 in which the tape drawing means draws the tape between the wheels generally along the wheel diameters.

5. The lapping apparatus of claim 3 in which said recess has a diameter of the order of one-quarter the outer diameter of the abrasive surface.

6. The lapping apparatus of claim 5 in which the tape drawing means draws the tape between the wheels generally along the wheel diameters, and the twist in the tape is opposite at the contact with the two portions of the abrasive surfaces.

7. The lapping apparatus of claim 1 in which the spacing between the abrasive surfaces is of the order of 85% to 95% of the width of the tape.

8. The lapping apparatus of claim 7 in which the width of the tape is of the order of 0.250 inch and the distance between the abrasive surfaces is of the order of 0.215 to 0.230 inch.

9. The lapping apparatus of claim 1 including a second pair of axially aligned, counter-rotating wheels having facing abrasive surfaces spaced apart a distance less than the width of the tape, the wheels of the second pair being substantially coplanar with the wheels of the first pair; and
    means drawing the tape serially between the first pair and the second pair of wheels.

10. Apparatus for lapping the edges of a metal foil tape, comprising:
    a pair of axially aligned, counter-rotating wheels having facing parallel abrasive surfaces spaced apart a distance less than the width of the tape;
    means for directing the tape between said abrasive surfaces with the plane of the tape generally at right angles to the planes of the abrasive surfaces;
    a second pair of axially aligned, counter-rotating wheels having facing abrasive surfaces spaced apart a distance less than the width of the tape, the wheels of the second pair being substantially coplanar with the wheels of the first pair;
    means directing the tape serially between the first pair and the second pair of wheels; and
    means for rotating the wheels of the second pair in directions opposite the direction of rotation of the coplanar wheels of the first pair.

11. The lapping apparatus of claim 9 in which the distance between the abrasive surfaces of the second pair of wheels is less than the distance between the abrasive surfaces of the first pair of wheels.

12. The lapping apparatus of claim 9 in which the abrasive surfaces of each of the wheels is annular and the tape directing means directs the tape between the wheels substantially along the diameters thereof, and the twist in the tape is reversed in crossing the central portion of the wheels.

13. The lapping apparatus of claim 11 in which the width of the tape is of the order of 0.250 inch, the abrasive surfaces of the first pair of wheels are spaced apart a distance of the order of 0.230 inch and the abrasive surfaces of the second pair of wheels are spaced apart a distance of the order of 0.215 inch.

14. The lapping apparatus of claim 1 including a pair of counter-rotating brushes and means for directing the tape from the abrasive wheels between said brushes.

15. The lapping apparatus of claim 1 in which said abrasive surfaces are soft metal carriers with abrasive particles embedded therein.

16. The lapping apparatus of claim 15 for a metal foil tape of a thickness of the order of 0.0005 inch wherein the abrasive particles have a size of the order of 5 to 10 microns.

17. The lapping apparatus of claim 1 including means for adjusting the position of one of said wheels axially with respect to the other to vary the spacing between the abrasive surfaces.

18. The lapping apparatus of claim 17 including:
a support plate;
a wheel bearing housing secured to said support plate;
a bearing carrier threaded to said housing;
a bearing in said carrier; and
a shaft having said wheel mounted thereon, received in said bearing, rotation of the bearing carrier adjusting the axial position of the wheel.

19. Apparatus for deburring the edges of a thin metal foil tape, comprising:
a supply reel containing a roll of thin metal foil tape;
a take-up reel for receiving deburred tape;
means for driving the take-up reel to wind tape thereon;
means for braking the supply reel to maintain predetermined tension in the tape between the take-up reel and the supply reel;
a pair of axially aligned wheels having facing abrasive surfaces spaced apart at a distance less than the width of the tape;
means for rotating the wheels in opposite directions;
means for guiding tape from the supply reel in a path between said abrasive surfaces with the edges of the tape engaging the abrasive surfaces;
means for guiding tape from the wheel to the take up reel; and
means for detecting the presence or absence of tape.

20. The deburring apparatus of claim 19 in which said braking means is adjustable.

21. Apparatus for deburring the edges of a thin metal foil tape, comprising:
a supply reel containing a roll of thin metal foil tape;
a take-up reel for receiving deburred tape;
means for driving the take-up reel to wind tape thereon;
means for braking the tape leaving the supply reel to maintain predetermined tension in the tape between the take-up reel and the supply reel;
a pair of axially aligned wheels having facing abrasive surfaces spaced apart at a distance less than the width of the tape;
means for rotating the wheels in opposite directions;
means for guiding tape from the supply reel in a path between said abrasive surfaces with the edges of the tape engaging the abrasive surfaces; and
means for guiding tape from the wheel to the take-up reel.

* * * * *